(12) United States Patent
Macken

(10) Patent No.: US 9,558,774 B1
(45) Date of Patent: Jan. 31, 2017

(54) RECORDING HEAD WITH ELECTRICALLY REMOVABLE COMPONENT

(71) Applicant: Seagate Technology LLC, Cupertino, CA (US)

(72) Inventor: Declan Macken, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/865,341

(22) Filed: Sep. 25, 2015

(51) Int. Cl.
G11B 5/60 (2006.01)
G11B 19/04 (2006.01)
G11B 5/31 (2006.01)
G11B 5/00 (2006.01)

(52) U.S. Cl.
CPC ........... G11B 5/6076 (2013.01); G11B 5/3106 (2013.01); G11B 5/6005 (2013.01); G11B 5/607 (2013.01); G11B 19/048 (2013.01); G11B 5/3133 (2013.01); G11B 2005/0021 (2013.01)

(58) Field of Classification Search
CPC ..... G11B 5/3106; G11B 5/3133; G11B 5/607; G11B 5/6005; G11B 19/048; G11B 33/0021; G11B 2005/0021
USPC .......................................... 360/324.4
See application file for complete search history.

(56) References Cited

U.S. PATENT DOCUMENTS

| | | | | |
|---|---|---|---|---|
| 5,867,461 A * | 2/1999 | Baas | ..................... | G11B 7/0948 369/44.32 |
| 6,233,127 B1 * | 5/2001 | Shimazawa | ............ | B82Y 10/00 360/319 |
| 6,483,657 B1 * | 11/2002 | Fioravanti | ............ | G11B 5/6005 360/25 |
| 6,754,015 B2 | 6/2004 | Erden et al. | | |
| 7,009,820 B1 * | 3/2006 | Hogg | ....................... | G11B 5/40 257/355 |
| 8,139,310 B1 * | 3/2012 | Hogg | ..................... | G11B 5/607 360/25 |
| 8,169,751 B2 * | 5/2012 | Albrecht | .................. | G11B 5/40 360/234.5 |
| 8,351,157 B2 | 1/2013 | Nishioka et al. | | |
| 8,477,456 B2 | 7/2013 | Kautzky et al. | | |
| 8,730,607 B1 * | 5/2014 | Garzon | .................. | G11B 5/607 360/55 |
| 8,804,272 B1 * | 8/2014 | Dakroub | .............. | G11B 5/6005 360/46 |
| 8,810,952 B2 | 8/2014 | Johnson et al. | | |
| 9,153,272 B1 * | 10/2015 | Rausch | ................ | G11B 7/1267 |

(Continued)

OTHER PUBLICATIONS

File History for U.S. Appl. No. 14/097,412.

*Primary Examiner* — Carlos E Garcia
(74) *Attorney, Agent, or Firm* — Hollingsworth Davis, LLC

(57) ABSTRACT

An apparatus includes a slider of a magnetic recording transducer comprising a plurality of electrical bond pads. A component is coupled to a pair of the electrical bond pads. A sensor is coupled to the pair of the electrical bond pads in parallel with the component. The sensor is configured to sense for one or more of thermal asperities of a magnetic recording medium, voids of the medium, spacing changes between the slider and the medium, and contact between the slider and the medium. The sensor is configured to be rendered non-functional in response to the sensor receiving a predetermined signal. The component is configured to remain operable after the sensor is rendered non-functional.

19 Claims, 8 Drawing Sheets

(56) References Cited

U.S. PATENT DOCUMENTS

| | | | |
|---|---|---|---|
| 2003/0043491 A1* | 3/2003 | Riddering | G11B 5/581 360/69 |
| 2005/0002303 A1* | 1/2005 | Kwon | G11B 7/1263 369/53.26 |
| 2005/0162785 A1* | 7/2005 | Granstrom | G11B 5/3166 360/323 |
| 2007/0097557 A1* | 5/2007 | Seagle | G11B 5/11 360/323 |
| 2007/0201155 A1 | 8/2007 | Iwase | |
| 2008/0019032 A1* | 1/2008 | Hayakawa | G11B 5/6005 360/75 |
| 2009/0168214 A1* | 7/2009 | Araki | G01R 31/2884 360/31 |
| 2009/0310246 A1 | 12/2009 | Takahashi | |
| 2010/0091401 A1* | 4/2010 | Ohwe | G11B 5/112 360/75 |
| 2012/0120519 A1 | 5/2012 | Kunkel et al. | |
| 2014/0119164 A1* | 5/2014 | Wilson | G11B 5/314 369/13.32 |
| 2015/0162038 A1* | 6/2015 | Macken | G11B 5/607 360/75 |

\* cited by examiner

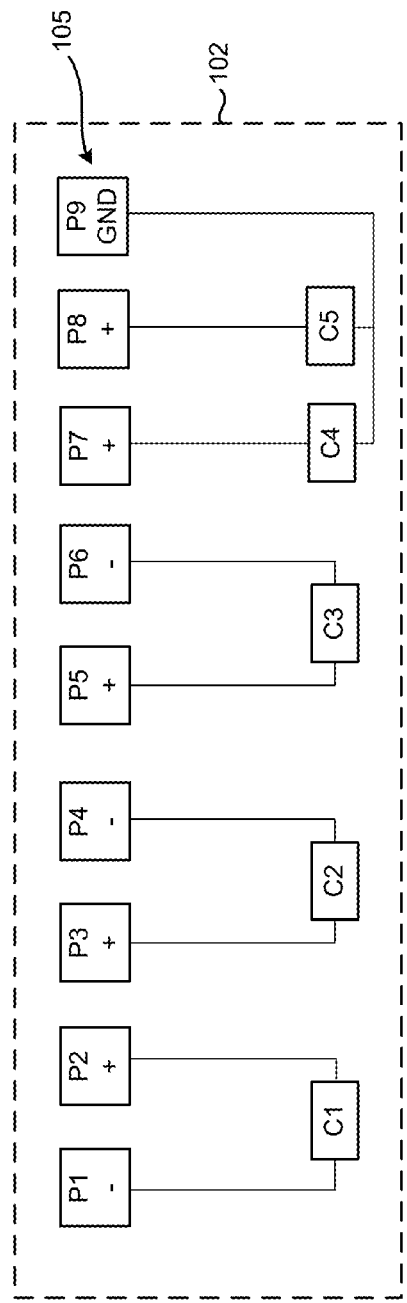
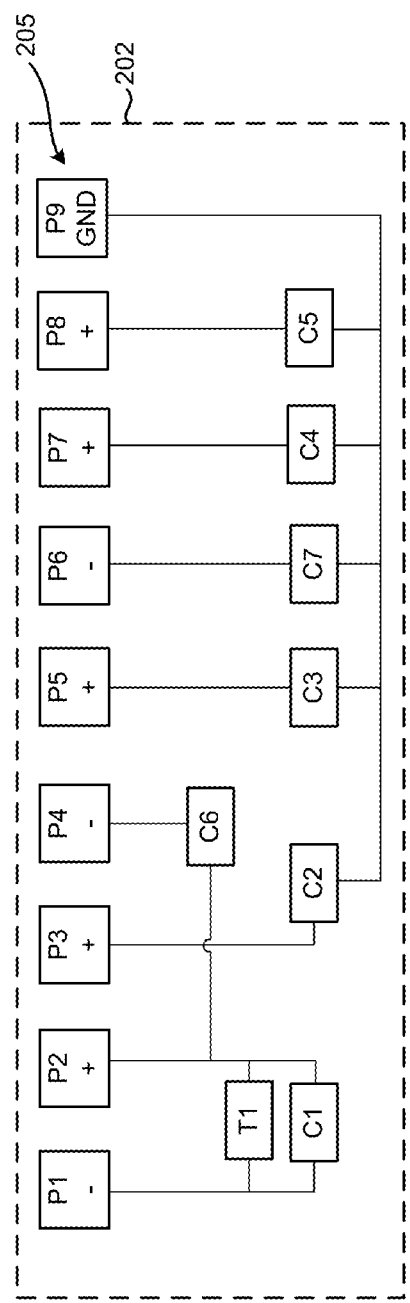
Figure 1
Figure 2

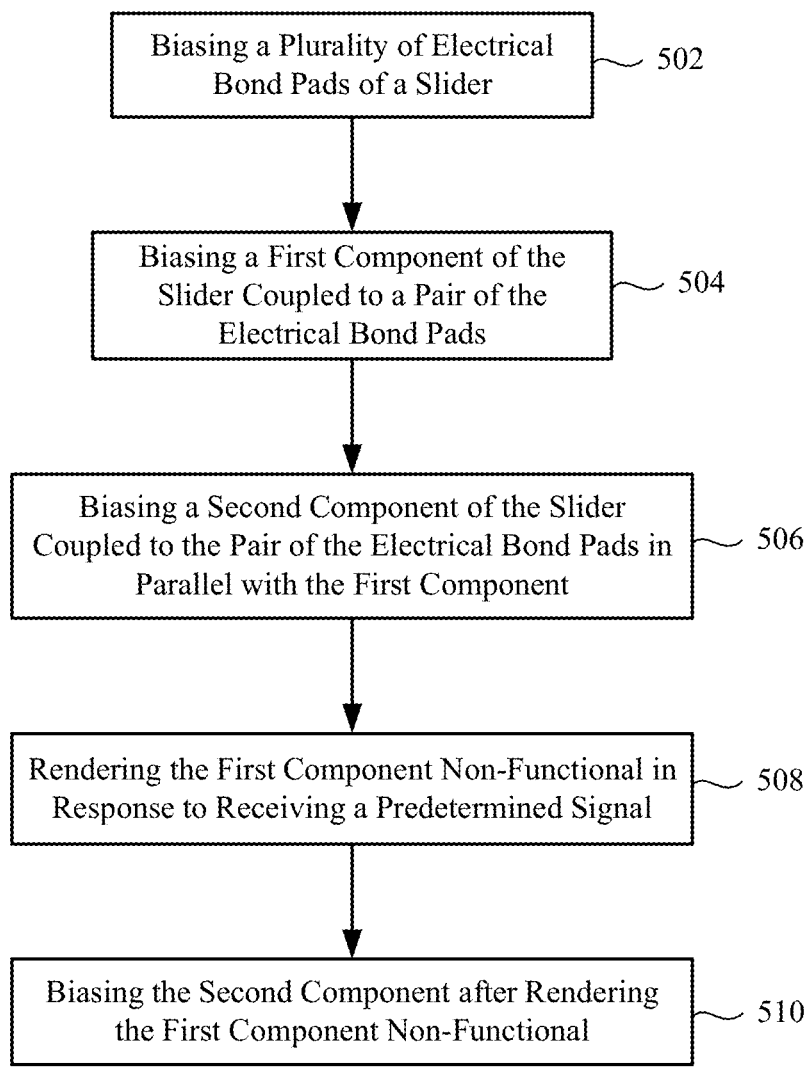

RECORDING HEAD WITH ELECTRICALLY REMOVABLE COMPONENT

SUMMARY

Various embodiments are directed to an apparatus which includes a slider of a magnetic recording transducer comprising a plurality of electrical bond pads and a plurality of components coupled to the electrical bond pads. A first component is coupled to a pair of the electrical bond pads. A second component is coupled to the pair of the electrical bond pads in parallel with the first component. The first component is configured to be rendered non-functional in response to the first component receiving a predetermined signal. The second component is configured to remain operable after the first component is rendered non-functional.

Some embodiments are directed to an apparatus which includes a slider of a magnetic recording transducer having a plurality of electrical bond pads. A component is coupled to a pair of the electrical bond pads. A sensor is coupled to the pair of the electrical bond pads in parallel with the component. The sensor is configured to sense for one or more of thermal asperities of a magnetic recording medium, voids of the medium, spacing changes between the slider and the medium, and contact between the slider and the medium. The sensor is configured to be rendered non-functional in response to the sensor receiving a predetermined signal. The component is configured to remain operable after the sensor is rendered non-functional.

Other embodiments are directed to an apparatus which includes a slider of a magnetic recording transducer having a plurality of electrical bond pads. The slider comprises a plurality of electrical bond pads and a plurality of components. A sensor is coupled to a pair of the electrical bond pads, and configured to sense for one or more of thermal asperities of a magnetic recording medium, voids of the medium, spacing changes between the slider and the medium, and contact between the slider and the medium. The sensor is configured to be rendered non-functional in response to the sensor receiving a predetermined signal. The pair of the electrical bond pads is coupled to the non-functional sensor and provides biasing to at least one of the plurality of components of the slider.

According to some embodiments, a method comprises biasing a plurality of electrical bond pads of a slider of a magnetic recording transducer and biasing a sensor of the slider coupled to a pair of the electrical bond pads. A component is coupled to the pair of the electrical bond pads in parallel with the sensor. The method also comprises sensing for one or more of thermal asperities of a magnetic recording medium, voids of the medium, spacing changes between the slider and the medium, and contact between the slider and the medium using the sensor. The method further comprises rendering the sensor non-functional in response to receiving a predetermined signal by the sensor, and biasing the component after rendering the sensor non-functional.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 1 illustrates an embodiment of a recording transducer that does not utilize pad sharing;

FIG. 2 illustrates a recording transducer that utilizes pad sharing according to embodiments of the present disclosure;

FIG. 5 is a flow chart illustrating a method that involves biasing a plurality of electrical bond pads of a slider of a magnetic recording transducer that includes at least one temporary component according to various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 3:
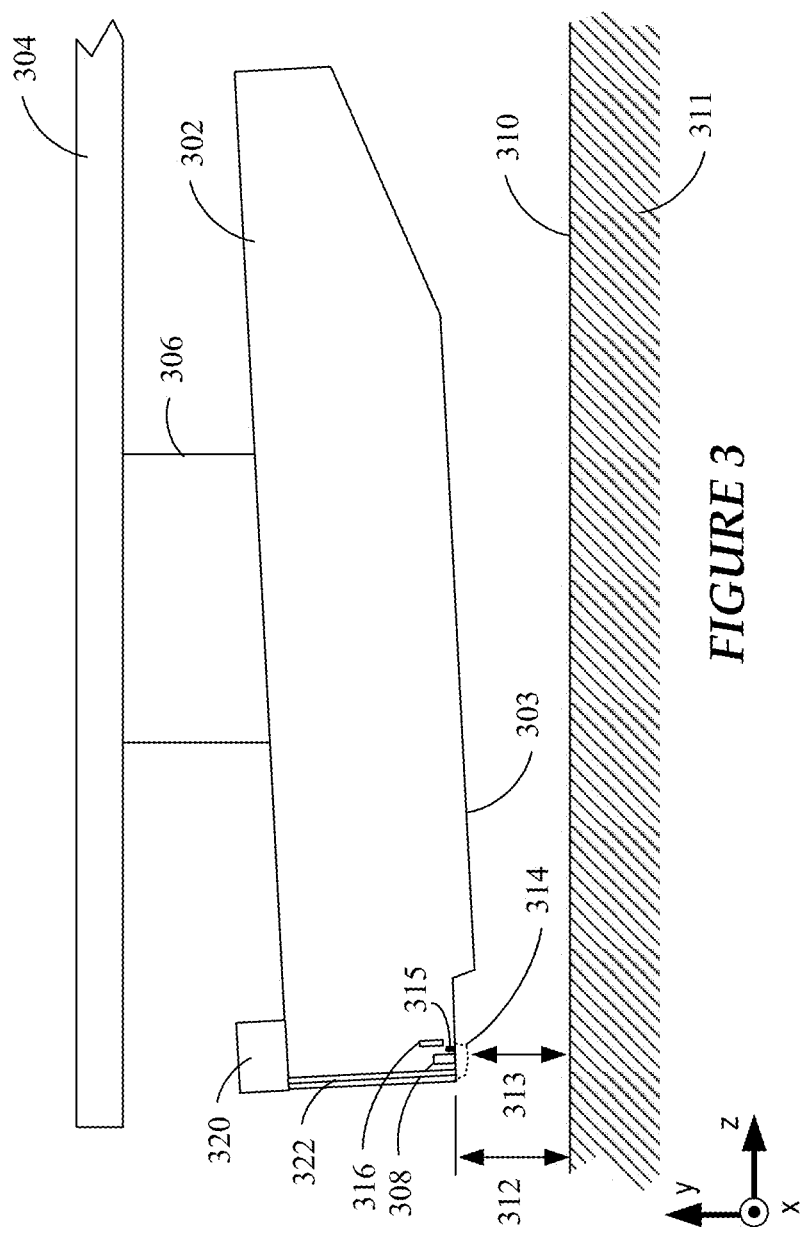
FIG. 3 shows a side view of a read/write transducer configured for heat-assisted magnetic recording (HAMR) according to a representative embodiment.

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include one or more readers, one or more reader heaters, one or more writers, and one or more writer heaters, among other possible components. Some recording transducers incorporate one or more sensors, such as a contact sensor, a temperature sensor, and a light intensity sensor, each requiring specified operating voltages/currents. Each of the electrically activated components of a transducer is electrically coupled to corresponding electrical contacts or bond pads of the transducer.

Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

Various embodiments of the disclosure are directed to a transducer that incorporates a set of bond pads coupled to bias sources and a multiplicity of electrical components coupled to the bond pad set, wherein at least one of the bond pads is shared between at least two of the electrical components, and at least one of the electrical components is coupled in parallel with an electrically removable component. The electrically removable component, such as a sensor, is typically used during an early phase of device life and later rendered non-functional, thereby freeing up bond pad connections for another electrical component of the transducer.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider, one of which is used temporarily then subsequently rendered non-functional, while one or more other components coupled to the shared bond pad remain operational.

Sharing a common bond pad between two or more electrical components (e.g., readers) can raise the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements (e.g., two, three or more readers). Another example of this approach involves a bond pad shared between electrical components, one of which is used temporarily and subsequently rendered non-functional, that operate at different times or can be operated alternately.

One example of this approach involves a bond pad shared between a contact sensor (e.g., a thermal coefficient of resistance (TCR) contact sensor) and one or more readers. Another example involves a bond pad shared between a contact sensor and an optical sensor, such as a bolometer. The contact sensor may only be required at an early phase of a device's service life, such as for detecting/mapping asperities of a magnetic recording medium and setting transducer clearance relative to the medium. After the contact sensor has served its intended purpose, the contact sensor can be electrically removed from the bond pad circuitry, such as by causing an open circuit at the contact sensor (e.g., like blowing a fuse).

FIG. 1 illustrates an embodiment of a recording transducer that does not utilize pad sharing according to the present disclosure. FIG. 2 illustrates a recording transducer that utilizes pad sharing according to embodiments of the present disclosure. The bond pad layout shown in FIG. 1 is the same as that shown in FIG. 2, and the electrical components identified as C1-C5 in FIG. 1 are the same as those shown as components C1-C5 in FIG. 2 for purposes of illustration. FIG. 2 includes a temporary electrical component, T1, which is coupled in parallel with component C1 to bond pads P1 and P2. It is understood that the bond pad layout, components, and wiring configuration shown in FIGS. 1 and 2 are provided for non-limiting illustrative purposes.

FIG. 1 illustrates a slider 102 that supports a recording transducer comprising a multiplicity of electrical components (C1-C5) coupled to a set 105 of bond pads (P1-P9). The set 105 of bond pads includes eight electrical bond pads (P1-P8) and one ground pad (P9, also referred to herein simply as ground). It is to be understood that a ground pad is not considered an electrically energized bond pad that is coupled to a bias source. Rather, a ground pad is a pad coupled to an electrical ground of the transducer circuitry. The term "electrical bond pad" refers to a bond pad that is coupled to a bias source, such as a voltage or current source (AC or DC), that provides power for an electrical component. The slider 102 shown in FIG. 1 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state.

FIG. 2 shows an apparatus according to various embodiments that includes a slider 202 comprising a plurality of electrical bond pads coupled to bias sources 205. The slider 202 further comprises a plurality of electrical components each coupled to at least one of the electrical bond pads. At least one of the electrical bond pads is shared between a plurality of the electrical components. According to some embodiments, the slider 202 supports a recording transducer comprising a multiplicity of electrical components (C1-C7) coupled to a set 205 of bond pads (P1-P9). As previously discussed, the set 205 of bond pads is the same as the bond pad set 105 shown in FIG. 1 (i.e., 8 electrical bond pads and 1 ground pad). In contrast to the slider 102 illustrated in FIG. 1 which supports five electrical components using eight electrical bond pads, the slider 202 shown in FIG. 2 supports seven electrical components while using the same number (i.e., 8) of electrical bond pads.

In FIG. 2, electrical bond pad P2 is shared between electrical components C1 and C6, thereby freeing up one electrical bond pad for other use or elimination. The electrical component C2 in FIG. 2, which performs the same function as C2 in FIG. 1, is implemented as a single-ended component, thereby freeing up one electrical bond pad for other use or elimination. By freeing up two electrical bond pads in the illustrative slider 202 shown in FIG. 2, two additional components (C6 and C7) have been added to the slider 202 as compared to the implementation illustrated in FIG. 1.

As was previously discussed, a temporary component, T1, is shown coupled in parallel with component C1 to bond pads P1 and P2. The temporary component, T1, is intended to represent a component that is used on a temporary basis and, at the appropriate time, is rendered non-functional in a manner that electrically removes component T1 from the circuitry shown in FIG. 2. For example, electrically removing component T1 can involve electrically overstressing the component T1 so that an open circuit is created in the electrical connection between bond pads P1 and P2 and the component T1. By appropriately biasing bond pads P1 and P2, a predetermined signal (voltage or current) can be generated sufficient to cause an open circuit in the component T1, rendering the component T1 non-functional. Notably, the component C1 remains connected to the bond pads P1 and P2 and continues to be operable. By sharing bond pads between component C1 and temporary component T1, one or more bond pads that would be needed to bias temporary component T1 can be used for powering one or more other components (e.g., C1 and C6).

For example, components C1 and C6 shown in FIG. 2 can represent separate readers of a multiple-reader recording head (e.g., a Multi-Sensor Magnetic Recording head or MSMR head, also referred to as a Two-Dimensional Magnetic Recording head or TDMR head). In some embodiments, a recording head can include two readers, while in other embodiments, three readers can be incorporated in a recording head. It is noted that a recording head can include multiple writers in addition to multiple readers. The temporary component T1 can be a contact and/or asperity sensor, for example. The sensor T1 can be used for one or both of contact detection (e.g., clearance testing) and thermal asperity detection, which can involve detection and mapping of thermal asperities and voids of the magnetic recording medium. Contact detection and asperity detection can be performed during disk drive setup (e.g., during and/or after manufacturing prior to drive shipment) using the temporary sensor T1. After completion of disk drive setup, the temporary sensor T1 can be rendered non-functional, such as by its electrical removal from the circuit via a predetermined overstressing signal. Readers C1 and C6 continue to be operative following electrical removal of the temporary sensor T1.

The need for sharing of electrical bond pads has intensified in the advent of recording heads configured for heat-assisted magnetic recording (HAMR), also referred to as energy-assisted magnetic recording (EAMR), thermally-assisted magnetic recording (TAMR), and thermally-assisted recording (TAR). In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316. A thermal sensor 315 is shown situated at or near the close point 314 (e.g., adjacent the read/write transducers 308, such as near the near-field transducer) or can be positioned at other location of the ABS 303.

Figure 4:
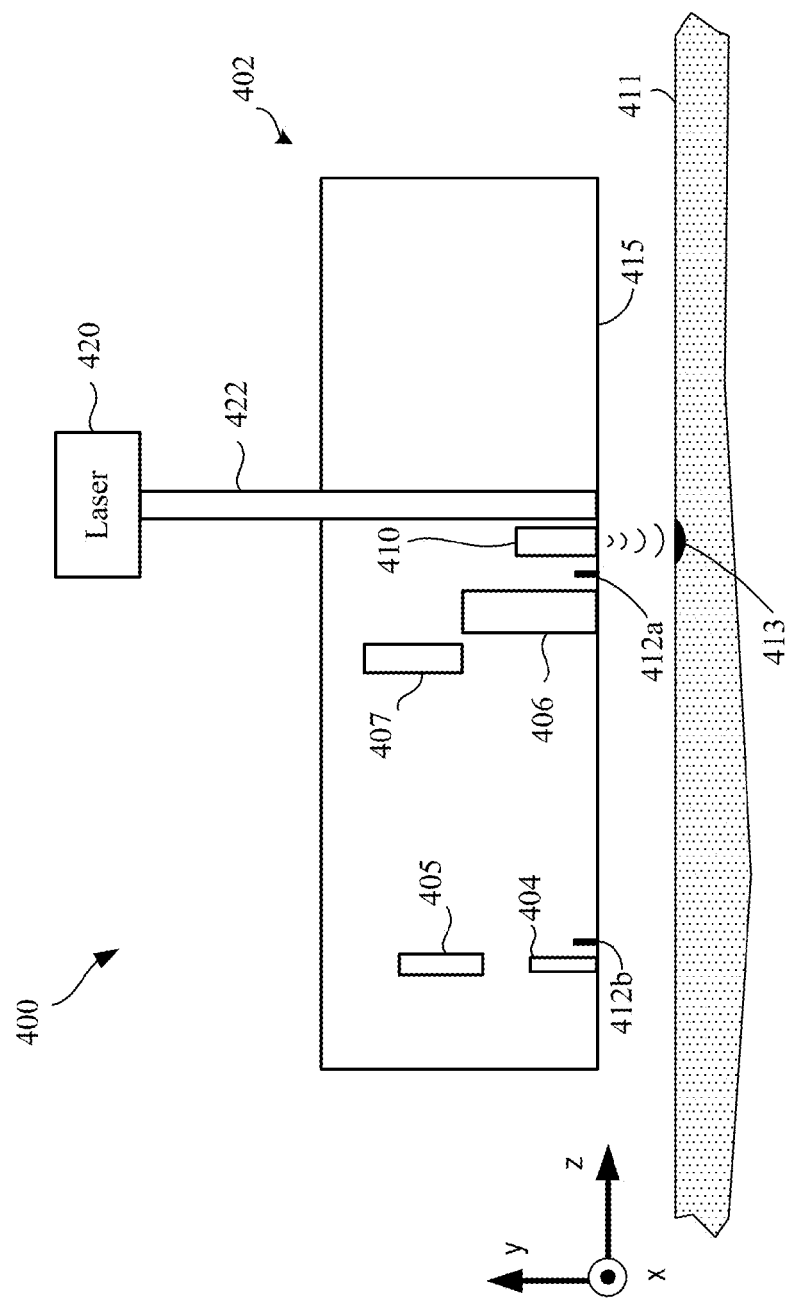
FIG. 4 shows a HAMR head arrangement in accordance with various embodiments.

FIG. 4 shows a HAMR head arrangement 400 in accordance with various embodiments. The recording head arrangement 400 includes a slider 402 positioned proximate a rotating magnetic medium 411. The slider 402 includes a reader 404 and a writer 406 proximate the ABS 415 for respectively reading and writing data from/to the magnetic medium 411. The writer 406 is located adjacent a near-field transducer (NFT) 410 which is optically coupled to a light source 420 (e.g., laser diode) via a waveguide 422. The light source 420 can be mounted external, or integral, to the slider 402. The light source 420 energizes the NFT 410 via the waveguide 422. The writer 406 includes a corresponding heater 407, and the reader 404 includes a corresponding heater 405 according to various embodiments. The writer heater 407 can be powered to cause protrusion of the ABS 415 predominately in the ABS region at or proximate the writer 406, and the reader heater 405 can be powered to cause protrusion of the ABS 415 predominately in the ABS region at or proximate the reader 404. Power can be controllably delivered independently to the heaters 407 and 405 to adjust the fly height (e.g., clearance) of the slider 402 relative to the surface of the recording medium 411. One or more thermal sensors 412a, 412b can be situated at various locations on the slider 402 at or near the ABS 415 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 413 over the track of the magnetic medium 411 where writing takes place, as shown in FIG. 4. The light from the source 420 propagates to the NFT 410, e.g., either directly from the source 420 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 413 is on the order of 50 nm or less. Thus, the desired hot spot size is well below half the wavelength of the light. Optical focusers cannot be used to obtain the desired hot spot size, being diffraction limited at this scale. As a result, the NFT 410 is employed to create a hot spot on the media.

The NFT 410 is a near-field optics device configured to generate local surface plasmon resonance at a designated (e.g., design) wavelength. The NFT 410 is generally formed from a thin film of plasmonic material (e.g., gold, silver, copper) on a substrate. In a HAMR slider 402, the NFT 410 is positioned proximate the write pole of the writer 406. The NFT 410 is aligned with the plane of the ABS 415 parallel to the read/write surface of the magnetic medium 411. The NFT 410 achieves surface plasmon resonance in response to the incident electromagnetic energy. The plasmons generated by this resonance are emitted from the NFT 410 towards the magnetic medium 411 where they are absorbed to create the hot spot 413. At resonance, a high electric field surrounds the NFT 410 due to the collective oscillations of electrons at the metal surface (e.g., substrate) of the magnetic medium 411. At least a portion of the electric field surrounding the NFT 410 tunnels into, and gets absorbed by, the magnetic medium 411, thereby raising the temperature of the spot 413 on the medium 411 as data is being recorded.

Turning now to FIG. 5, there is shown a flow chart illustrating a representative method that involves biasing 502 a plurality of electrical bond pads of a slider of a magnetic recording transducer. The method involves biasing 504 a first component of the slider coupled to a pair of the electrical bond pads, and biasing 506 a second component of the slider coupled to the pair of the electrical bond pads in parallel with the first component. The method also involves rendering 508 the first component non-functional in response to receiving a predetermined signal by the first component, and biasing 510 the second component for operation after rendering the first component non-functional. Some embodiments involve sensing for one or more of thermal asperities of a magnetic recording medium, voids of the medium, spacing changes between the slider and the medium, and contact between the slider and the medium using the first component prior to rendering the first component non-functional.

Figure 6A:
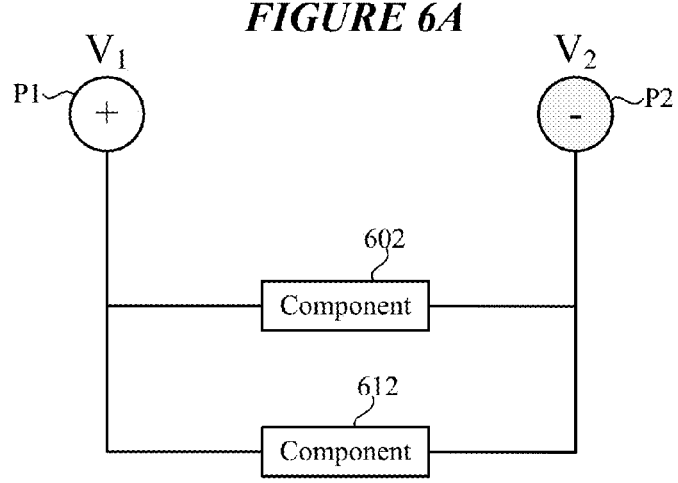
FIGS. 6A and 6B illustrate circuits that support bond pad sharing between a multiplicity of components, at least one of which is a temporary component, in accordance with various embodiments.
Figure 6B:
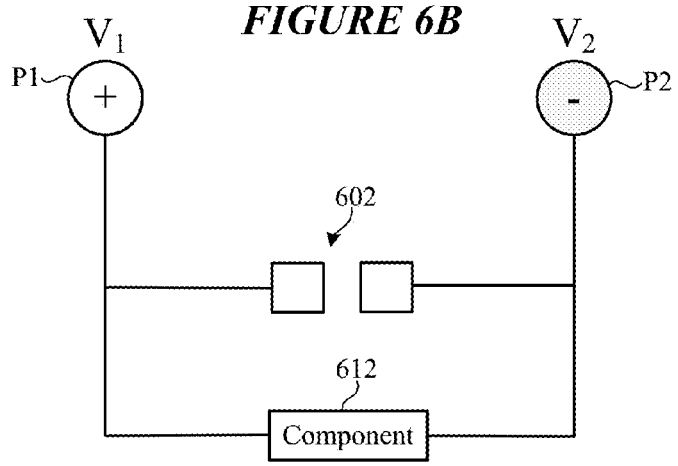

Various embodiments of bond pad sharing by a multiplicity of transducer components and at least one temporary component will now be described in greater detail. The embodiment illustrated in FIGS. 6A and 6B is directed to a slider that includes a plurality of electrical bond pads, two of which (P1 and P2) are shown for illustrative purposes. A first component 602 is coupled to a pair of the electrical bond pads, P1 and P2. A second component 612 is coupled to the pair of the electrical bond pads P1 and P2 in parallel with the first component 602. In some embodiments, both components 602 and 612 are situated at or near an air bearing surface of the slider. In other embodiments, one of the components 602 and 612 is situated at or near an air bearing surface of the slider, and the other of the components 602 and 612 is situated elsewhere on the slider.

In some embodiments, the first component 602 is configured to operate on a temporary basis, and the second component 612 is configured to operate on a long-term basis (e.g., for the service life of a device that incorporates the slider). The first component 602 is configured to be rendered non-functional in response to the first component 602 receiving a predetermined signal. FIG. 6B illustrates one representative scenario by which the first component 602 can be rendered non-functional in response to a predetermined signal developed between the bond pads P1 and P2. FIG. 6B shows an open circuit caused by electrically overstressing the first component 602 (or a trace or electrical lead connected to the first component 602) by supplying a sufficiently high current to the first component 602 (e.g. like blowing a fuse). The second component 612 is configured to remain operable after the first component 602 is rendered non-functional.

In some embodiments, the first component 602 is a sensor configured to sense for one or more of thermal asperities of a magnetic recording medium, voids of the medium, spacing changes between the slider and the medium, and contact between the slider and the medium. Embodiments of the disclosure are generally directed to long-term and temporary components of a slider that are dual-ended devices not connected to ground via a ground pad, which avoids signal processing complexities due to ground noise.

Figure 6C:
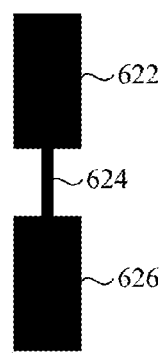
FIG. 6C illustrates an element of the circuitry shown in FIGS. 6A and 6B which includes a weak location designed to render a temporary component of a slider non-functional in response to a predetermined signal according to some embodiments.

FIG. 6C illustrates an element of the circuitry shown in FIGS. 6A and 6B which includes a weakened location designed to render the first component 602 non-functional in response to a predetermined signal according to some embodiments. In some embodiments, FIG. 6C represents the first component 602 (or a portion thereof) which incorporates a pinch point 624 or other form of a weak point that is susceptible to electrical stress relative to adjacent locations 622 and 626. The weak point 624 can be a thinned electrically conductive region (e.g., a region of reduced cross-section) that can be electrically overstressed and blown like a fuse to create an open circuit in response to a current of sufficient amperage.

In other embodiments, FIG. 6C represents a portion (or separate portions) of the trace or electrical lead that connects the first component 602 to one (or both) of the two bond pads P1 and P2. The trace or electrical lead can include a thinned region (e.g., a region of reduced cross-section) that can be electrically overstressed and blown like a fuse to create an open circuit in response to a current of sufficient amperage. The threshold current required to render the first component 602 non-functional, either directly or via an open circuit in the trace/electrical lead connected to the first component 602, can be determined through experimentation, empirically, and/or modeling. The threshold current is preferably selected to effectively render the first component 602 non-functional, while not causing damage to the second component 612.

In FIGS. 6A and 6B, bond pads P1 and P2 can be biased in a number of ways, such as by alternating the polarity of the voltages, V1 and V2, supplied to bond pads P1 and P2. In FIG. 6A, the voltage $V_1$ of bond pad P1 is greater than the voltage $V_2$ of bond pad P2. As illustrated, the voltage $V_1$ is a positive voltage, and the voltage $V_2$ is a negative voltage. According to some embodiments, the first and second components 602 and 612 are configured to operate concurrently given the polarity of the voltages $V_1$ and $V_2$ shown in FIG. 6A. In some embodiments, the first and second components 602 and 612 can be configured to operate alternately based on the polarity of the voltages $V_1$ and $V_2$. For example, the first component 602 can be operative, while the second component 612 is inoperative, given the polarity of the voltages $V_1$ and $V_2$ shown in FIG. 6A. In response to reversing the polarity of $V_1$ and $V_2$ shown in FIG. 6A (i.e., $V_1$ is a negative voltage and $V_2$ is a positive voltage), the first component 602 can be inoperative, while the second component 612 is operative. Alternating operation of the first and second components 602 and 612 can be implemented by the inherent design of the two components or by inclusion of a diode in series with each component 602 and 612, with each diode conducting in response to a different voltage polarity.

Various embodiments are directed to methods and apparatuses that include a plurality of components of a slider, including a temporary component of a slider such as a thermal sensor. The thermal sensor is coupled to a pair of the electrical bond pads of the slider. The thermal sensor is configured to sense for one or more of thermal asperities of a magnetic recording medium, voids of the medium, spacing changes between the slider and the medium, and contact between the slider and the medium. The thermal sensor is configured to be rendered non-functional in response to the sensor receiving a predetermined signal, and the pair of the electrical bond pads coupled to the non-functional sensor provides biasing to at least one of the plurality of components of the slider.

Figure 7A:
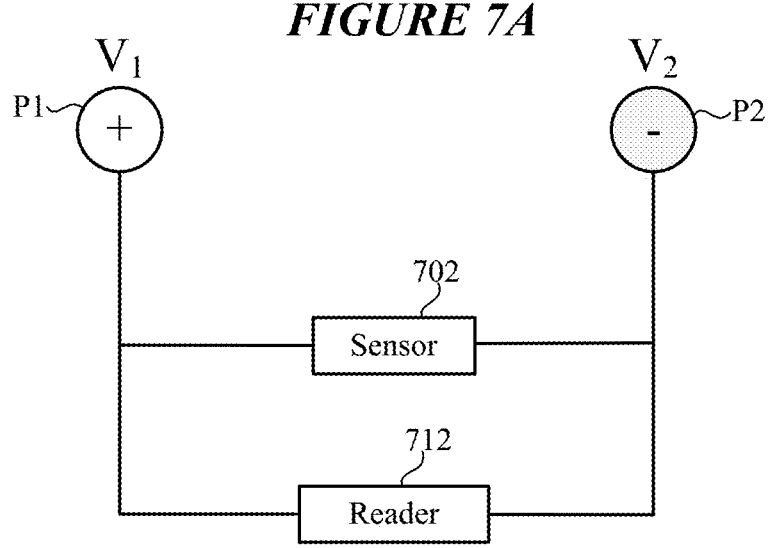
FIGS. 7A and 7B illustrate circuits that support bond pad sharing between a multiplicity of components, at least one of which is a temporary component, in accordance with various embodiments.
Figure 7B:
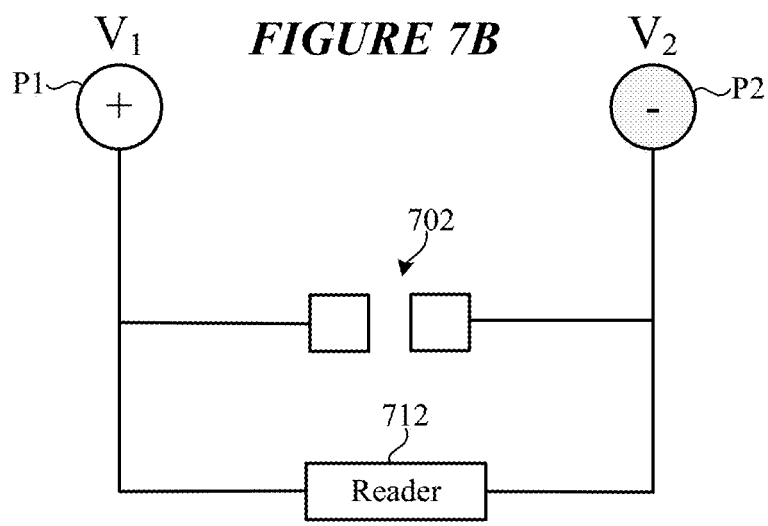

FIGS. 7A and 7B illustrate bond pad sharing by a multiplicity of transducer components, at least one of which is a temporary component, in accordance with various embodiments. In the embodiment shown in FIG. 7A, a sensor 702 is coupled to a pair of electrical bond pads, P1 and P2, of a slider. The sensor 702 can be a sensor configured to sense for one or more of thermal asperities of a magnetic recording medium, voids of the medium, spacing changes between the slider and the medium, and contact between the slider and the medium. The sensor 702 may be a thermal sensor, such as a sensor having thermal coefficient of resistance (TCR), such as a dual-ended TCR sensor (e.g., a DETCR).

In the embodiments shown in FIGS. 7A and 7B, a reader 712 of the slider is coupled to the two bond pads P1 and P2 in parallel with the sensor 702. The sensor 702 is designed to be a temporary component of the slider, such that the sensor 702 is used for a limited time (e.g., during disk drive setup) and then electrically removed from the circuit, as is depicted in FIG. 7B. In response to a predetermined signal (e.g., a signal with sufficiently high amperage) developed across the two bond pads P1 and P2, the sensor 702 (or a trace connected to the sensor 702) is configured to break electrical continuity between the two bond pads P1 and P2. The reader 712 remains operational after the sensor 702 is rendered non-functional.

Figure 8A:
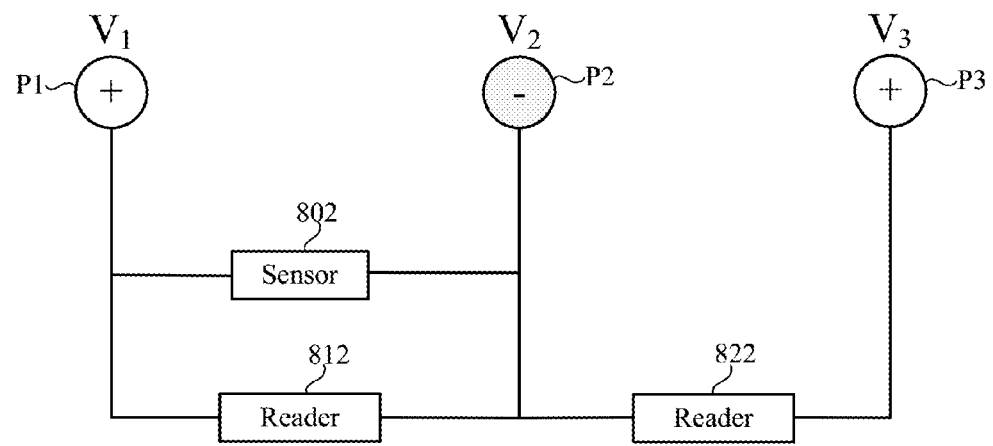
FIGS. 8A and 8B illustrate circuits that support bond pad sharing between a multiplicity of components, at least one of which is a temporary component, in accordance with various embodiments.
Figure 8B:
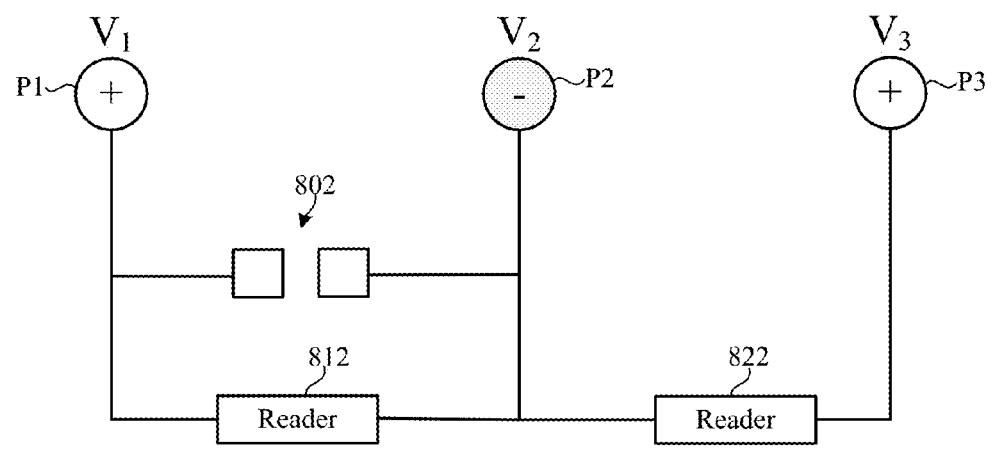

FIGS. 8A and 8B illustrate bond pad sharing by a multiplicity of transducer components, at least one of which is a temporary component, in accordance with various embodiments. In the embodiment shown in FIG. 8A, a sensor 802 is coupled to a pair of electrical bond pads, P1 and P2, of a slider. The sensor 802 may be a thermal sensor, such as a DETCR described previously in the context of FIGS. 7A and 7B. In the embodiments shown in FIGS. 8A and 8B, a first reader 812 of the slider is coupled to the two bond pads P1 and P2 in parallel with the sensor 702. A second reader 822 is coupled between bond pad P2 and a third bond pad, P3. The embodiment illustrated in FIGS. 8A and 8B is directed to an MSMR or a TDMR slider configuration. The two readers 812 and 822 can be biased for selective operation by application of appropriate voltages at bond pads P1, P2, and P3.

The sensor 802 is designed to be a temporary component of the slider, such that the sensor 802 is used for a limited time and then electrically removed from the circuit, as is depicted in FIG. 8B. In response to a predetermined signal (e.g., a signal with sufficiently high amperage) developed across the two bond pads P1 and P2, the sensor 802 (or a trace connected to the sensor 802) is configured to break electrical continuity between the two bond pads P1 and P2. The two readers 812 and 822 remain operational after the sensor 802 is rendered non-functional.

Figure 9A:
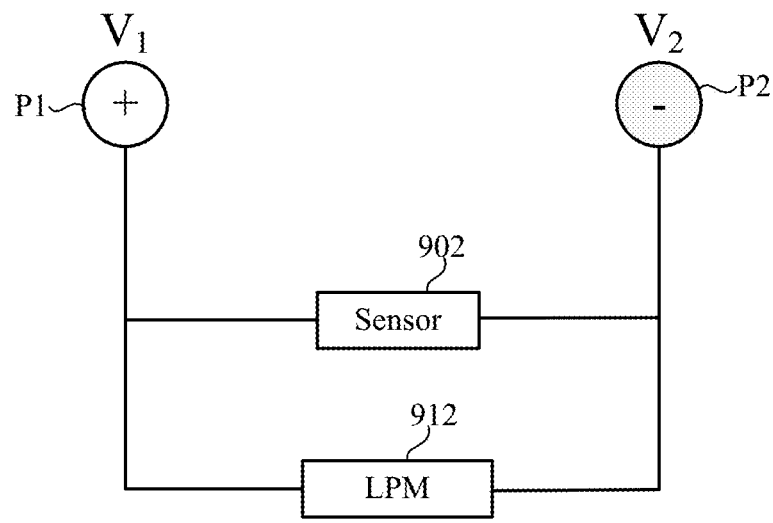
FIGS. 9A and 9B illustrate circuits that support bond pad sharing between a multiplicity of components, at least one of which is a temporary component, in accordance with various embodiments.
Figure 9B:
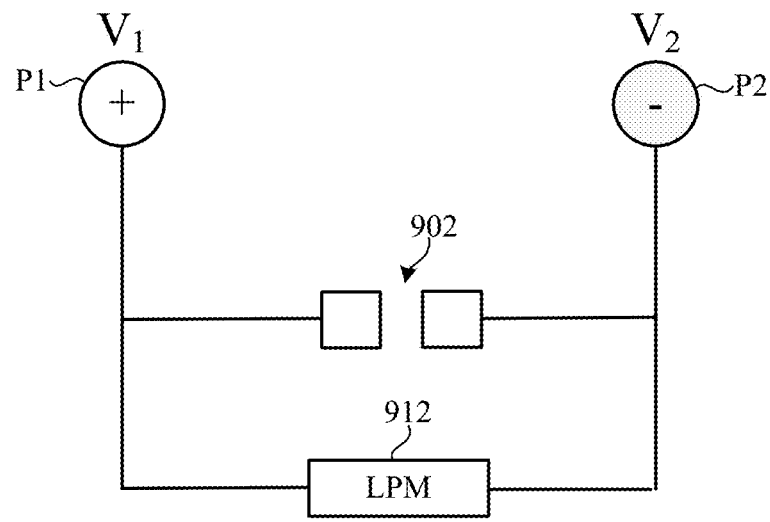

FIGS. 9A and 9B illustrate bond pad sharing by a multiplicity of transducer components, at least one of which is a temporary component, in accordance with various embodiments. In the embodiment shown in FIG. 9A, a sensor 902 is coupled to a pair of electrical bond pads, P1 and P2, of a slider. The sensor 902 can be a sensor configured to sense for one or more of thermal asperities of a magnetic recording medium, voids of the medium, spacing changes between the slider and the medium, and contact between the slider and the medium (e.g., a DETCR).

In the embodiments shown in FIGS. 9A and 9B, a laser power monitor (LPM) 912 of the slider is coupled to the two bond pads P1 and P2 in parallel with the sensor 902. The laser power monitor 912 is a sensor configured to generate a signal in response to optical energy impinging on the sensor 912. The laser power monitor 912, for example, can be implemented as a bolometer. A bolometer, for example, can be implemented as a small wire having a temperature coefficient of resistance and positioned proximate or in the vicinity of an optical component (e.g., NFT, waveguide) of a HAMR slider. The laser power monitor 912 is configured to sense and monitor the output optical power of the laser source used to energize the NFT via the waveguide of the slider.

The sensor 902 is designed to be a temporary component of the slider, such that the sensor 902 is used for a limited time (e.g., during disk drive setup) and then electrically removed from the circuit, as is depicted in FIG. 9B. In response to a predetermined signal (e.g., a signal with sufficiently high amperage) developed across the two bond pads P1 and P2, the sensor 902 (or a trace connected to the sensor 902) is configured to break electrical continuity between the two bond pads P1 and P2. The laser power monitor 912 remains operational after the sensor 902 is rendered non-functional.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
    a slider of a magnetic recording transducer, the slider comprising a plurality of electrical bond pads;
    a component coupled to a pair of the electrical bond pads; and
    a sensor coupled to the pair of the electrical bond pads in parallel with the component, the sensor configured to sense for one or more of thermal asperities of a magnetic recording medium, voids of the medium, spacing changes between the slider and the medium, and contact between the slider and the medium;

wherein the sensor is configured to be rendered permanently non-functional in response to the sensor receiving a predetermined signal, and the component is configured to remain operable after the sensor is rendered non-functional.

2. The apparatus of claim 1, wherein the sensor comprises a thermal sensor.

3. The apparatus of claim 1, wherein the component comprises a bolometer.

4. The apparatus of claim 1, wherein the component comprises a reader.

5. The apparatus of claim 1, wherein the slider comprises a plurality of readers, and the component is one of the plurality of readers.

6. The apparatus of claim 1, wherein the slider is configured for heat-assisted magnetic recording.

7. The apparatus of claim 1, wherein:
the slider comprises a waveguide optically coupled to a light source and a near-field transducer optically coupled to the waveguide; and
the component is configured to sense output optical power of the light source.

8. The apparatus of claim 1, wherein the predetermined signal comprises an electrical signal that electrically stresses the sensor sufficient to open a circuit defined between the sensor and the pair of electrical bond pads.

9. An apparatus, comprising:
a slider of a heat-assisted magnetic recording transducer, the slider comprising a plurality of electrical bond pads, a plurality of components, a waveguide optically coupled to a light source, and a near-field transducer optically coupled to the waveguide;
a first component coupled to a pair of the electrical bond pads, the first component configured to sense for one or more of thermal asperities of a magnetic recording medium, voids of the medium, spacing changes between the slider and the medium, and contact between the slider and the medium; and
a second component coupled to the pair of the electrical bond pads in parallel with the first component;
wherein the first component is configured to be rendered permanently non-functional in response to the first component receiving a predetermined signal, and the pair of the electrical bond pads coupled to the non-functional first component provides biasing to at least the second component.

10. The apparatus of claim 9, wherein the first component comprises a thermal sensor.

11. The apparatus of claim 9, wherein the second component comprises a bolometer.

12. The apparatus of claim 9, wherein the second component comprises a reader.

13. The apparatus of claim 9, wherein the slider comprises a plurality of readers, and the second component is one of the plurality of readers.

14. The apparatus of claim 9, wherein:
the second component is configured to sense output optical power of the light source.

15. The apparatus of claim 9, wherein the predetermined signal comprises an electrical signal that electrically stresses the first component sufficient to open a circuit defined between the first component and the pair of the electrical bond pads.

16. A method, comprising:
biasing a plurality of electrical bond pads of a slider of a magnetic recording transducer;
biasing a sensor of the slider coupled to a pair of the electrical bond pads, a component coupled to the pair of the electrical bond pads in parallel with the sensor;
sensing for one or more of thermal asperities of a magnetic recording medium, voids of the medium, spacing changes between the slider and the medium, and contact between the slider and the medium using the sensor;
rendering the sensor permanently non-functional in response to receiving a predetermined signal by the sensor; and
biasing the component after rendering the sensor non-functional.

17. The method of claim 16, wherein rendering the sensor non-functional comprises opening a circuit defined between the sensor and the pair of the electrical bond pads using the predetermined signal.

18. The method of claim 16, wherein the slider comprises a plurality of readers, and the component is one of the plurality of readers.

19. The method of claim 16, wherein:
the slider comprises a waveguide optically coupled to a light source and a near-field transducer optically coupled to the waveguide; and
the component is configured to sense output optical power of the light source.

* * * * *